US012502549B2

(12) United States Patent
Sykora

(10) Patent No.: US 12,502,549 B2
(45) Date of Patent: Dec. 23, 2025

(54) UV-LED INDUCTION OF MEASURABLE BIOLOGICAL ENDPOINTS

(71) Applicant: Amelia Technologies, Washington, DC (US)

(72) Inventor: Peter Sykora, Baltimore, MD (US)

(73) Assignee: Amelia Technologies, Washington, DC (US)

( * ) Notice: Subject to any disclaimer, the term of this patent is extended or adjusted under 35 U.S.C. 154(b) by 0 days.

(21) Appl. No.: 17/935,093

(22) Filed: Sep. 24, 2022

(65) Prior Publication Data

US 2023/0128072 A1 Apr. 27, 2023

Related U.S. Application Data

(60) Provisional application No. 63/270,892, filed on Oct. 22, 2021.

(51) Int. Cl.
*F21K 9/64* (2016.01)
*A61N 5/06* (2006.01)
*F21Y 115/10* (2016.01)

(52) U.S. Cl.
CPC .................. *A61N 5/06* (2013.01); *F21K 9/64* (2016.08); *F21Y 2115/10* (2016.08)

(58) Field of Classification Search
CPC ............... F21Y 2115/10; F21Y 115/10; G01N 2201/062; G01N 2201/0626; F21K 9/64
See application file for complete search history.

(56) References Cited

U.S. PATENT DOCUMENTS 9,182,336 B2 * 11/2015 Chen ........................ G02B 6/04
2014/0319380 A1 * 10/2014 Plohnke ................. C12M 41/36
250/492.1

* cited by examiner

*Primary Examiner* — William J Carter

(57) ABSTRACT

Composition, systems, and methods for the induction of biological endpoints in a cheap contained system. In many embodiments, variation on well numbers on plates and ranging ultraviolet wavelengths produces different and controlled outcomes of the biological endpoint induction. Endpoint induction of this type allows for chemical induction, wherein the system can be turned on and off in short time periods.

2 Claims, 3 Drawing Sheets

UV-LED INDUCTION OF MEASURABLE BIOLOGICAL ENDPOINTS

FEDERAL FUNDS STATEMENT

This invention was made with Government support under SBIR/STTR contract number ES032435. The Government has certain rights in this invention.

TECHNICAL FIELD

Embodiments of the present invention relate to inducing measurable biological endpoints. More particularly embodiments may allow for study in organic responses to stress.

PRIOR ART

U.S. Pat. No. 1,856,969
U.S. Pat. No. 9,279,797 B2
U.S. Pat. No. 10,780,189 B2
US 2022/0040304 A1
US 2017/0028213 A1
U.S. Pat. No. 11,033,749 B2
U.S. Pat. No. 11,413,308
U.S. Pat. No. 11,007,291
U.S. Pat. No. 11,375,898
Bloom E, Cleaver J, Sayre R M, Maibach H I, Polansky J R. Halogen lamp phototoxicity. Dermatology. 1996; 193(3):207-11. doi: 10.1159/000246247. PMID: 8944342.
Zigman, S. (1993). OCULAR LIGHT DAMAGE. Photochemistry & Photobiology, 57,

BACKGROUND

Standard stress induction systems are bulky not easily portable and do not utilize the latest techniques. Utilizing new light emitting diodes allows for more portable and smaller batch applications. These induction systems are either radiation-based system available to hospitals and large research institutions, or chemical induction, which is messy and leaves residue on the cells, not amenable to repair based assays.

One major innovation of the technology is the precision of the system, where using chemical induction, the chemical needs to be placed on the cells, incubated, taken off the cells, cells washed multiple times, but chemical residue remains. The induction system, through an optogenetic approach, is instantaneous and can be turned on and off in milliseconds.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
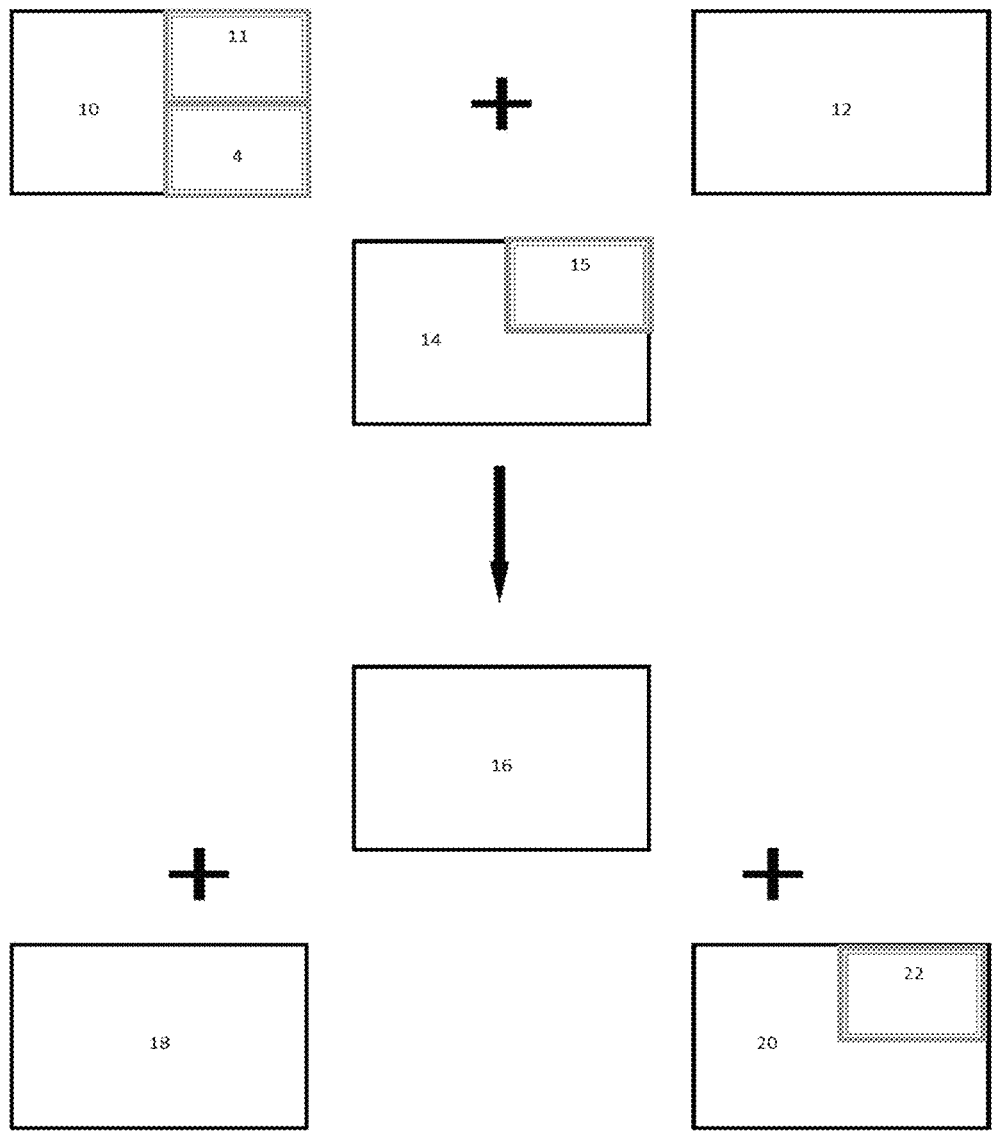
FIG. 1 is a pictorial representation of an example of a composition according to an embodiment.

Turning to FIG. 1 the composite parts in an embodiment include a well plate component 10, containing wells 11 a light cone array component 12, and light-emitting diode component 14, with ultraviolet components 15. These three components may be combined to create the damage induction system 16.

In another embodiment, the damage induction system 16 may be modified by adding additional wells or reducing number of wells 11 in component 10.

In many embodiments, the damage induction system 16 acts as an optogenetic approach.

In many embodiments, the wells 10 might number from one large well to 1536 microwells.

In one embodiment of the damage induction system 16, the ultraviolet light emitting diode component 14 selected might use nanometer lengths 220 to 400. These wavelengths inducing different measurable endpoints.

In another embodiment, well plate component 10 might be removable.

In one embodiment light emitting diode component 14 might modulate the wavelengths used based on an algorithm component 18.

In one embodiment light cone array component 12, sample well plate component 10, and light emitting diode component 14 combines into a portable damage induction system 16.

In one embodiment system might include a power source component 20; this component might be standard commercial transformer. This or another system might include a heat sink component 22.

In one embodiment plate component 10 might be composed of plate-based irradiation spectrophotometer curvettes 4.

In one embodiment plate component 10 might be composed of 15 ml and 50 ml tubes.

Many embodiments might involve the illustrated components being installed into a larger sample analysis system. Where the end result is a damage induction system 16. The components ingredients well plate component 10, light cone array component 12, and light emitting diode component 14 may also be included in a large device, so it is possible that making biological endpoints result in further analysis.

In one embodiment the system has an onboard cooling component that allows the unit to be placed in a biological incubator to be able to irradiate biological material at temperature so as to not disturb the cell environment.

Figure 2:
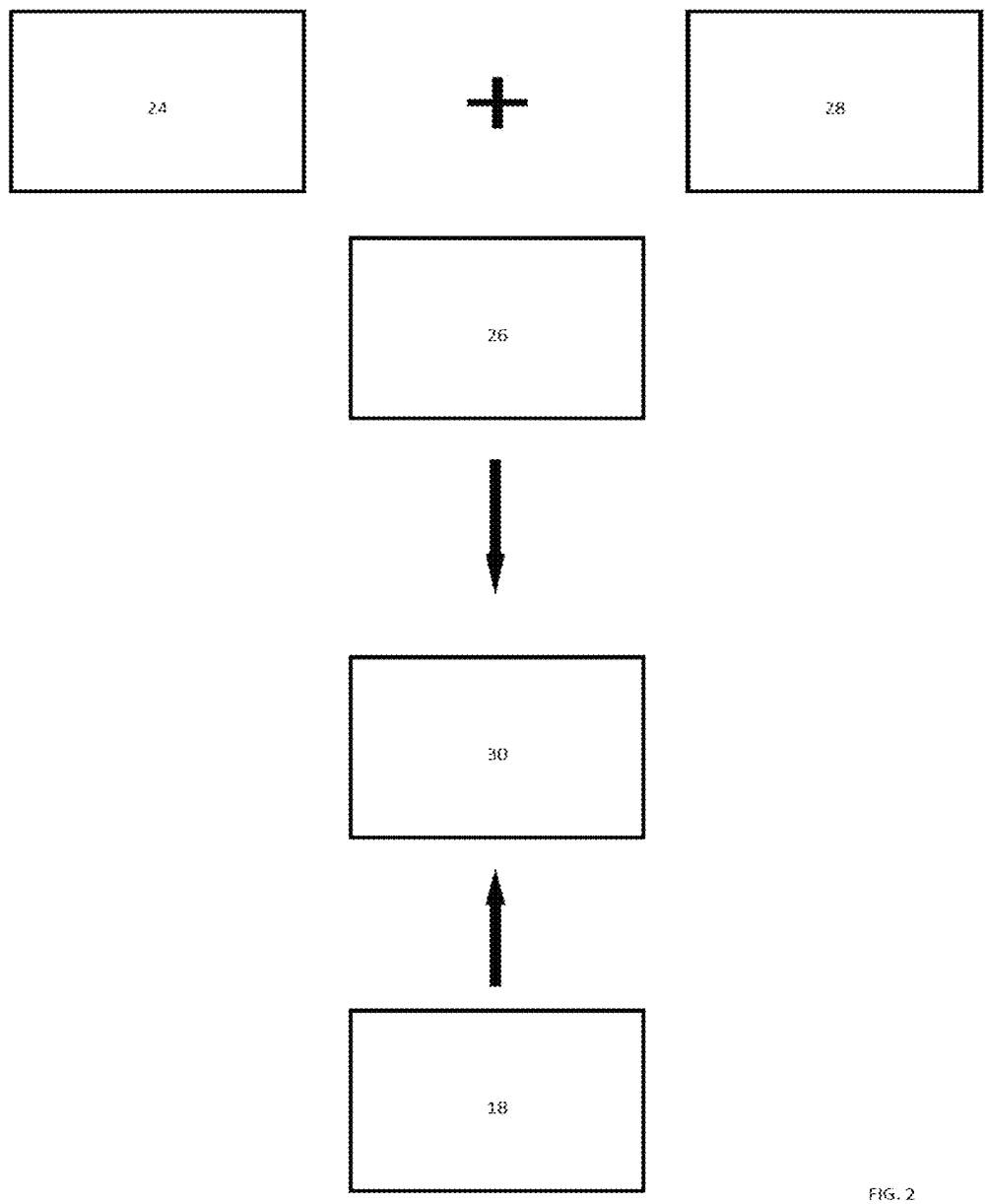
FIG. 2 is a diagrammatic representation of an example of a system inducing biological endpoints according to an embodiment.

One embodiment might utilize an algorithm 28 determining exposure and timing for induction. In some embodiments FIG. 2 could result in modulating wavelengths to produce measurable endpoints. Once the induction system 26 is controlled by an algorithm 28 as it might in one example of the schema, it can result in varied samples 30 for analysis.

In many embodiments of the induction system 26, samples 30 might be derived from the addition of algorithm 28 and exposure modulation component 24.

In some embodiments the induction system 26 does not utilize algorithm 28 or exposure modulation component 24. In the schema the system might include only the algorithm 28 in addition with the induction system 26; or alternatively only the exposure modulation component 24 with the induction system 26.

Figure 3:
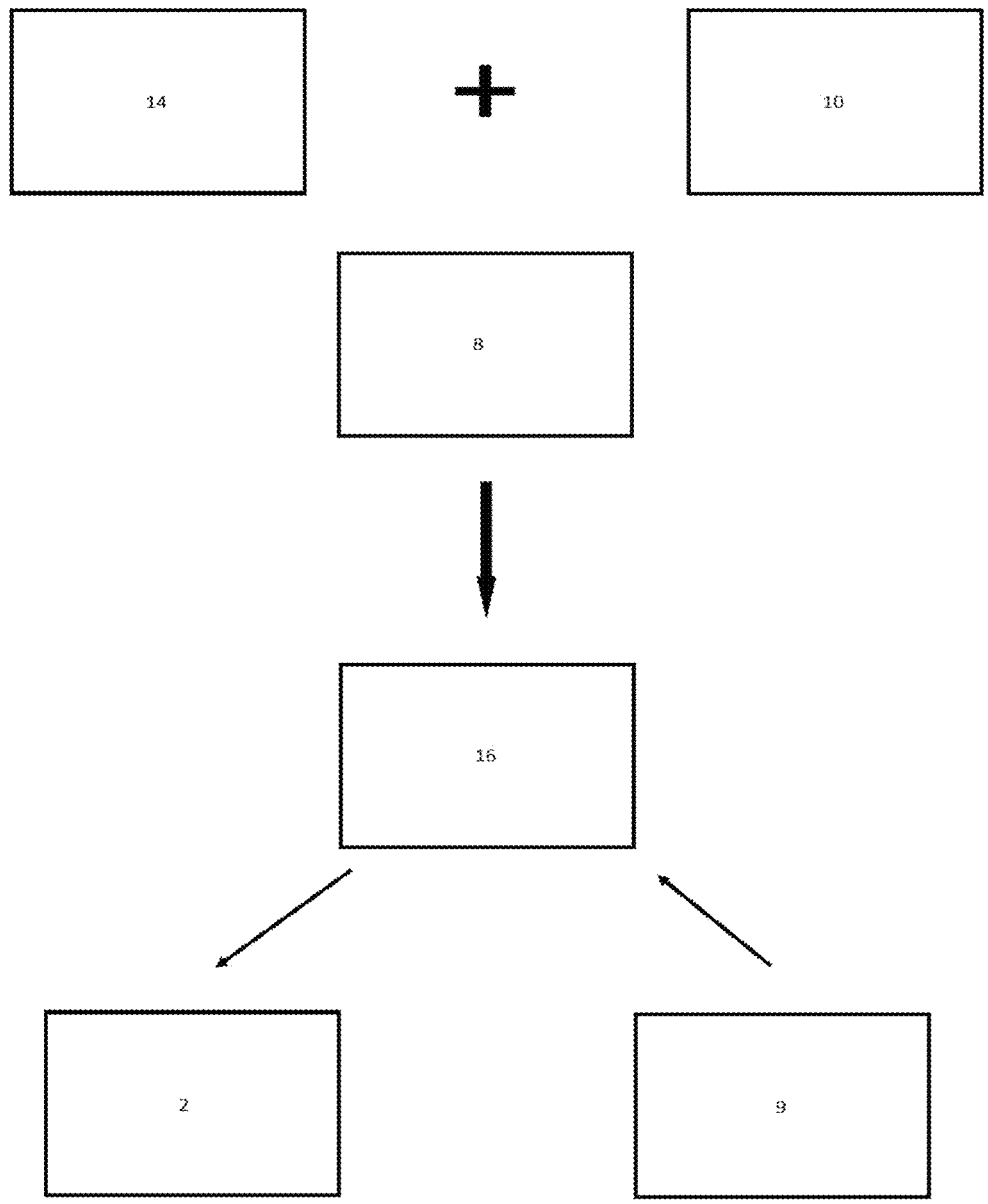
FIG. 3 is a pictorial representation of the elements included to create a damage induction system, and reach measurable biological endpoints, in an embodiment.

In FIG. 3 an accepted embodiment includes a light emitting diode 14, in conjunction with a specimen well plate component 6, with an exposure control component 8, to create a damage induction system 16.

In many embodiments biologic endpoints 2 are produced when a sample 9 is included.

In other embodiments the exposure control component 8 will utilize different specrums of ultraviolet light.

In many embodiments the exposure control component 8 will utilize a spectrum within the 280 to 315 nanometers range.

RELATED APPLICATIONS

The present application claims priority to and benefit from U.S. Provisional Application No. 63/270,892 filed Oct. 22, 2021, the entire contents of each of which are herein incorporated by reference.

I claim:

1. A method of inducing measurable biological oxidation by providing light at a wavelength within a range of 220 nanometers to 400 nanometers, wherein light source is a light emitting diode, wherein the biological oxidation includes oxidative lesions.

2. A method of making measurable biological oxidation comprising:
   providing a sample;
   adding light from light emitting diode light source within a range of 220 nanometers to 400 nanometers; and
   observing result, wherein the biological oxidation includes oxidative lesions.

* * * * *